(No Model.) 2 Sheets—Sheet 1.

E. D. NORTON.
COMBINED WASHBENCH AND IRONING TABLE.

No. 557,867. Patented Apr. 7, 1896.

Witnesses
Edwin L. Bradford
Chas. W. Boyle

Edwin D. Norton,
Inventor
by J. R. Littell,
his Attorney (No Model.) 2 Sheets—Sheet 2.

E. D. NORTON.
COMBINED WASHBENCH AND IRONING TABLE.

No. 557,867. Patented Apr. 7, 1896.

Witnesses
Edwin L. Bradford
Chas. W. Boyle

Edwin D. Norton
Inventor
By J. R. Littell,
his Attorney

UNITED STATES PATENT OFFICE.

EDWIN D. NORTON, OF DELEVAN, NEW YORK.

COMBINED WASHBENCH AND IRONING-TABLE.

SPECIFICATION forming part of Letters Patent No. 557,867, dated April 7, 1896.

Application filed November 14, 1895. Serial No. 568,951. (No model.)

*To all whom it may concern:*

Be it known that I, EDWIN D. NORTON, a citizen of the United States, residing at Delevan, in the county of Cattaraugus and State of New York, have invented certain new and useful Improvements in a Combined Washbench and Ironing-Table; and I do hereby declare that the following is a full, clear, and exact description of the invention, which will enable others skilled in the art to which it appertains to make and use the same.

This invention relates to that class of convertible apparatus or devices which are adapted for use both as a washbench and ironing-table; and it has for its object to provide an improved convertible washbench and ironing-table which will possess advantages in point of simplicity and inexpensiveness, ease of adjustment, convenience of use, effectiveness, and general efficiency.

Figure 1:
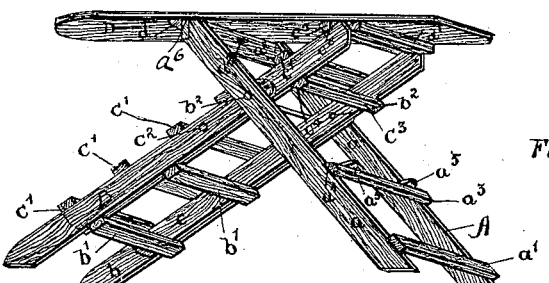
Figure 2:
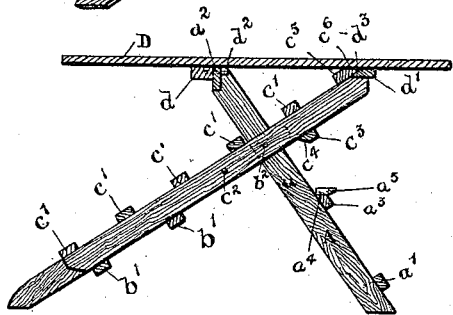
Figure 3:
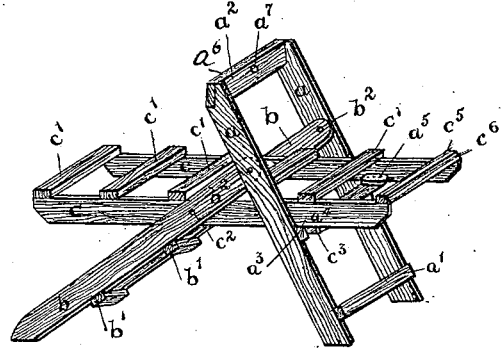
Figure 4:
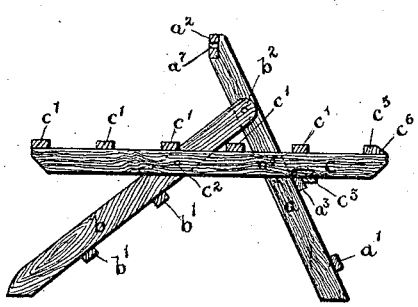
Figure 5:
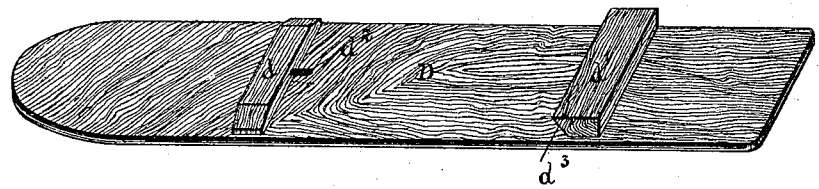
Figure 6:
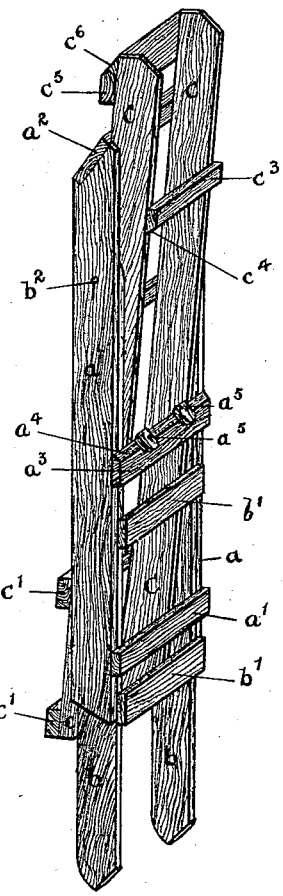
Figure 7:
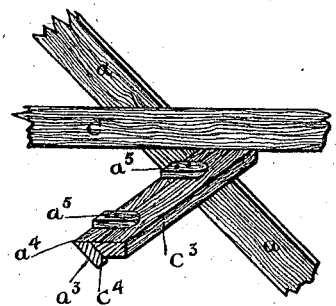
Figure 8:
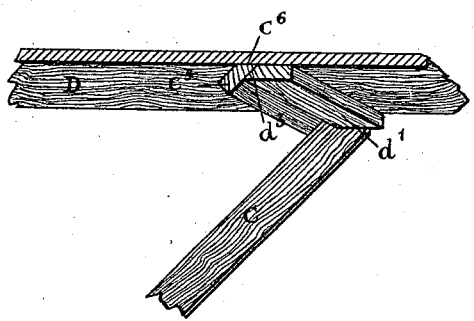

In the drawings, Figure 1 is a perspective view of my improved device in position for use as an ironing-table. Fig. 2 is a vertical longitudinal sectional view of the same. Fig. 3 is a perspective view of the device in position for use as a washbench. Fig. 4 is a vertical longitudinal sectional view of the same. Fig. 5 is a detail perspective view showing the under side of the ironing-board. Fig. 6 is a perspective view showing the device in folded compact position for transportation or when out of use. Fig. 7 is a detail perspective view, partly in section, showing the detachable connection between the washbench-rack and the main frame. Fig. 8 is a detail perspective view, partly in section, showing the detachable connection between the ironing-board and the top edge of the washbench-rack.

Referring to the drawings, A designates the main member of the main frame, which comprises side pieces $a$ $a$, connected by a suitable cross-piece $a'$ near the bottom and a flat transverse cross-piece or head-piece $a^2$ at the top. A similar cross-piece $a^3$ is provided at about the center of the frame A and has a beveled top edge $a^4$. The frame A is normally in inclined position, and the relative construction and arrangement is such that the head-piece $a^2$ is normally in vertical position and the beveled top edge $a^4$ of the middle cross-piece is normally in horizontal position, the head-piece $a^2$ being arranged at the rear face of the frame, while the cross-bars $a'$ and $a^3$ are arranged upon the upper side of the frame, so as to be out of the way when the device is folded into the compact position illustrated in Fig. 6.

B designates the supplementary member of the main frame, which comprises side bars $b$ $b$, pivotally connected to the side bars $a$ $a$ at a point below the top of the latter. The side bars $b$ $b$ are connected by suitable cross-pieces $b'$ $b'$, arranged at about the central portion of the frame B and on the under side of the latter, so that they will be out of the way when the device is in compact folded position. The side bars or pieces $b$ $b$ are pivotally connected, as at $b^2$ $b^2$, to the inner faces of the side bars or pieces $a$ $a$, so that the supplementary frame B will fold within the frame A.

The frames A and B conjointly form the main supporting-frame of the device and are adapted to rest upon the floor in normally divergent position, as shown.

C designates the washbench rack or frame, which comprises side bars or pieces $c$ $c$, pivotally mounted inside the frame B and pivotally connected to the side bars $b$ $b$ at a point below the pivots $b^2$ $b^2$ of the latter, as shown at $c^2$ $c^2$. The side bars $c$ $c$ are connected by transverse cross-pieces $c'$, arranged in a series over the side pieces $c$ $c$ and at the top of the latter.

The washbench rack or frame C is normally in horizontal position when the device is in use as a washbench, projecting through the frames A and B and adapted to sustain a tub or other washing apparatus in convenient position. When in normal horizontal position, the side bars $c$ $c$ rest upon the horizontal top edge $a^4$ of the cross-piece $a^3$ and project through the frames A and B. To rigidly lock the frame C and the frames A and B in this position, the frame C is provided on its under side, near its front end, with a cross-piece $c^3$, adapted to be engaged under projecting flanges $a^5$ $a^5$, provided on the top edge $a^4$, when the frames are adjusted upon their pivots, and the cross-piece $c^3$ is provided with a beveled inner edge $c^4$, adapted to rest closely against the face of the cross-piece $a^3$.

My improved device, as above described, is adapted for effective use as a washbench.

When it is desired to convert the device into an ironing-table, the washbench rack or frame C is disengaged from the projecting flanges $a^5$ and turned up upon its pivots, so that it rests within the supplementary frame B upon the cross-pieces $b'$ and forms an extension of the frame B at the top, which extension corresponds to the projecting top portion of the frame A. When in this position, the frames C and B conjointly form the supplementary supporting-frame of the device, adapted to support the ironing-board in conjunction with the frame A.

D designates the ironing-board, which is provided upon its under side with cross-pieces $d$ and $d'$, respectively, arranged a suitable distance apart. At the top end of the frame C is provided a retaining cross-piece $c^5$, having a beveled top edge $c^6$, which latter is normally in horizontal position when the device is used as an ironing-table. The ironing-board rests upon the horizontal beveled edge $c^6$ of the cross-piece $c^5$ and upon the horizontal top edge $a^6$ of the head-piece $a^2$.

To provide for locking the device in position when used as an ironing-table, the cross-piece $d$ of the ironing-board is provided with an inwardly-projecting pin or stud $d^2$, adapted to be engaged with a corresponding opening or perforation $a^7$ in the head-piece $a^2$, and when in position the inner face of the cross-piece $d$ rests closely against the outer face of the head-piece $a^2$, and the cross-piece $d'$ is provided with an inwardly-beveled inner edge $d^3$, adapted to be engaged under the beveled edge $c^6$ when the frames are moved upon their pivots.

The operation and advantages of my invention will be readily understood.

By reason of the improved construction and relative arrangement of parts the device may be readily and conveniently converted into either a washbench or an ironing-table, and when out of use it is adapted to be compactly folded, so that the inner frame rests within the outer frame, as shown in Fig. 6.

Having thus described my invention, I claim and desire to secure by Letters Patent—

1. A combined washbench and ironing-table, comprising the main member of the main frame having a cross-piece, as at $a^3$, and a top cross-piece, as at $a^2$; the supplementary member of the main frame pivoted to said main member; and the washbench rack or frame pivoted to said supplementary member at a point below the pivots of the latter and projecting through the main frame, said washbench-rack being provided with a cross-piece, as at $c^3$, adapted to engage the cross-piece $a^3$ and with a top cross-piece, as at $c^5$; in combination with an ironing-board provided on its under side with cross-pieces adapted to respectively engage the cross-pieces $a^2$ and $c^5$, substantially as and for the purpose set forth.

2. A combined washbench and ironing-table, comprising the main member of the main frame embodying side pieces connected by the cross-piece $a^3$ having projecting engaging devices and the top cross-piece, as at $a^2$; the supplementary member of the main frame embodying side pieces pivoted at their upper ends to the inner faces of the side pieces of said main member and connected by cross-pieces; and the washbench rack or frame embodying side pieces pivoted to the inner faces of the side pieces of said supplementary member below the pivots of the latter, connected by cross-pieces, and projecting through the main frame, said washbench-rack being provided with an under cross-piece, as at $c^3$, adapted to engage the cross-piece $a^3$ and with a cross top piece, as at $c^5$; in combination with an ironing-board provided on its under side with cross-pieces adapted to lock into engagement with the cross-pieces $a^2$ and $c^5$, substantially as and for the purpose set forth.

3. A combined washbench and ironing-table, comprising the main member of the main frame embodying the side pieces $a$ $a$ connected by the cross-piece $a^3$ having the projecting flanges and the top cross-piece $a^2$ having the opening or perforation $a^7$; the supplementary member of the main frame embodying the side pieces pivoted to the side pieces $a$ $a$ and connected by cross-pieces; and the washbench rack or frame embodying the side pieces $c$ $c$ connected by cross-pieces and pivoted to the side pieces $b$ $b$ below the pivots of the latter, said washbench-rack being provided with the under cross-piece $c^3$ adapted to engage under the flanges upon the cross-piece $a^3$ and with the top cross-piece $c^5$ having the beveled outer edge $c^6$; in combination with the ironing-board provided on its under side with the cross-piece $d$ having the inwardly-projecting pin $d^2$ and the cross-piece $d'$ provided with the inwardly-beveled inner edge $d^3$, substantially as and for the purpose set forth.

4. A convertible apparatus of the class described, comprising the main member of the main frame having a cross-bar forming a rest and a head-piece or top cross-bar, the supplementary member of the main frame pivoted at its top end to said main member, and the washbench rack or frame pivoted to and within said supplementary member and projecting through the main frame, in combination with an ironing-board adapted to rest upon the head-piece of said main member and the top of said pivoted washbench-frame and provided with means for locking it in engagement with said main member of the main frame and the pivoted washbench-frame, substantially as and for the purpose set forth.

In testimony whereof I affix my signature in presence of two witnesses.

EDWIN D. NORTON.

Witnesses:
R. W. THOMPSETT,
RAY THOMPSETT.